July 6, 1954

F. J. RUSSELL ET AL 2,683,053

LATCH OPERATING MEANS

Filed Sept. 1, 1950

FRED J. RUSSELL,
RAYMOND W. DIETRICH,
INVENTORS.
HUEBNER, BEEHLER, WORREL
and HERZIG
ATTORNEYS.

July 6, 1954     F. J. RUSSELL ET AL     2,683,053
LATCH OPERATING MEANS Filed Sept. 1, 1950     6 Sheets-Sheet 4

FRED J. RUSSELL,
RAYMOND W. DIETRICH,
INVENTOR.

HUEBNER, BEEHLER,
WORREL and HERZIG,
ATTORNEYS.

July 6, 1954     F. J. RUSSELL ET AL     2,683,053
LATCH OPERATING MEANS Filed Sept. 1, 1950     6 Sheets-Sheet 5

FRED J. RUSSELL,
RAYMOND W. DIETRICH,
INVENTORS.
HUEBNER, BEEHLER,
WORREL and HERZIG,
ATTORNEYS.
By Patented July 6, 1954

2,683,053

UNITED STATES PATENT OFFICE 2,683,053

LATCH OPERATING MEANS

Fred J. Russell, Beverly Hills, and Raymond W. Dietrich, Bell, Calif.

Application September 1, 1950, Serial No. 182,704

5 Claims. (Cl. 292—336.3)

This invention relates to a screen door lock.

Special conditions arising from screen door design and installation require certain limitations in locking devices for the same. The door is thin, and a soft bolt action is desirable. Ordinarily there will be a short back set, that is to say a short measurement from the edge of the door to the center of the spindle. There is commonly a very small space between the screen door and the main door, all of which necessitates a relatively miniature mechanism. In reducing conventional devices for screen door use many disadvantages are encountered.

It is an object of the present invention to provide a novel lock particularly suitable for the dimensional and space limitations imposed in screen door installation.

More particularly, an object of the invention is to provide a novel lock wherein the spindle which retracts the latch is axially shiftable to accomplish locking and unlocking, whereby when in one axial position the spindle is held against rotation by engagement with a fixed internal member, and when in another axial position a relief groove in the spindle registers with such fixed member but free of locking engagement therewith.

A further object is to provide means actuatable by the lock handle to shift the spindle to locking position and to release the spindle for return under spring action to unlocked position.

An additional object is to provide a door lock of the character identified structurally designed so that the relatively small and short bore-in hole from the edge of the door is utilized only for the latch assembly, and the relatively larger cross-bore area is utilized for the primary control mechanism whereby parts of sufficient size may be employed to secure greater leverage and smoother operation.

These and other objects and advantages of the invention will become further apparent from a consideration of the description taken in conjunction with the drawings.

The primary function of the lock is to enable the latch bolt thereof to be retracted by turning either the outer knob or the inner handle when the lock is in unlocked condition, but to conveniently put the lock in locked condition by a slight shift of the inner handle and thereby prevent the outer knob from being rotated and as a result prevent the latch from being retracted. As an incident to the locking function due to the construction of the lock, the inner handle cannot be turned when the device is locked.

The illustrated form of the device comprises an outer operating assembly 15, shown by way of example as embodying a knob 16, a rose 17 and a mounting plate 18. It comprises further an inner handle assembly 20 embodying in general a handle 21, an inner rose 22 and a mounting plate 23.

Extending between the outer operating assembly and the inner handle assembly is a spindle 25 which is operatively associated with a locking mechanism generally designated 26, the latter in turn being operatively connected with a latch bolt assembly 27.

Mounting posts 30 are fixed to the mounting plate 18 and are internally threaded to receive machine screws 31 which extend through suitable holes 32 and 33 in the rose 22 and mounting plate 23. This arrangement for mounting enables the lock to be installed on doors of various thicknesses without adjustment. It will be noted that the spindle 25 extends into a socket 34 in the outer operating assembly in a manner to permit considerable latitude of relative positioning along the common axis.

The spindle 25 is non-circular, being preferably square, and the socket 34 is complementary to the spindle. Consequently rotation of the outer operating assembly will rotate the spindle if the spindle is free to rotate, and if it is held against rotation the knob 16 cannot be turned.

The spindle is formed with a circumferential groove 35 which has a relationship to the locking mechanism 26 which latter includes a fixed locking plate 36 to be later described in detail. This locking plate 36 is provided with holes 37 through which the screws 31 pass, and is formed with a circumferential flange 38 which seats against the inside surface of the door.

Utilizing the plate 36 as a base, the locking mechanism 26 forms a sub-combination thereon which will subsequently be described.

Generally speaking, when the spindle 25, which is axially slidable, is in one position, the spindle groove 35 is located so that the locking mechanism 26 permits the spindle to rotate, but when the spindle is axially shifted so that the groove 35 is in another position, the squared portion of the spindle comes into locking engagement with the locking mechanism and the spindle is thereby held against rotation.

The inner handle assembly is utilized as the normal means for axially shifting the spindle to a locking position and releasing it for spring return to unlocked position. This assembly comprises a sleeve 40, which is rotatably anchored within the rose 22 and mounting plate 23. This relationship is accomplished by employing a washer 41 disposed against an annular shoulder 42 on the sleeve, and a hollow cap 43 at the outer end of the sleeve having a shoulder 44 engageable with the outer end of the rose 22. Sufficient longitudinal play is provided for the sleeve to have free rotation within the mounting plate. The sleeve has a square bore 45 complementary to the squared portion of the spindle, whereby rotation of the sleeve will impart rotation to the spindle. Such rotation can be imparted by turning the handle 21 which extends diametrically through the sleeve 40, being accommodated in holes 46 and 46' in the sleeve and cap.

The handle is illustrated in two parts 50 and 51 which can be threaded together, the part 50 having a diameter which can be inserted through the holes 46 and 46' but with a head 52 of large enough diameter to prevent the handle from being pulled entirely through these holes. In actual manufacture the threaded assembly arrangement will be dispensed with in favor of a handle assembly which cannot be manually disconnected.

The handle is formed with an annular groove 55 in which can nest a ball 56. This ball also engages a socket 57 in a head 58 formed on the inner end of the spindle. A compression spring 59 is interposed between the end of the sleeve 40 and the spindle head 58, the spring normally urging the spindle inwardly. This inner position in the form of device illustrated is the unlocked position. (See Figure 1.)

Figure 6:
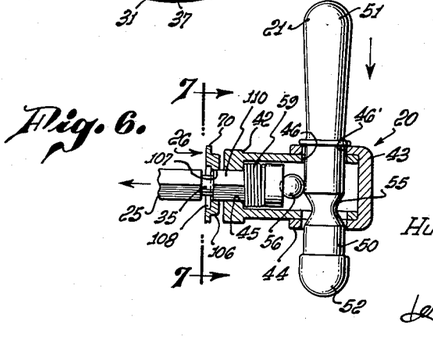
Figure 6 is a fragmentary section of mechanism seen at the right-hand portion of Figure 1 with the inside handle shifted to lock the door.
Figure 7:
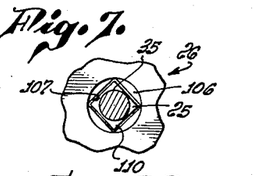
Figure 7 is a fragmentary vertical section taken on the line 7—7 of Figure 6.
Figure 9:
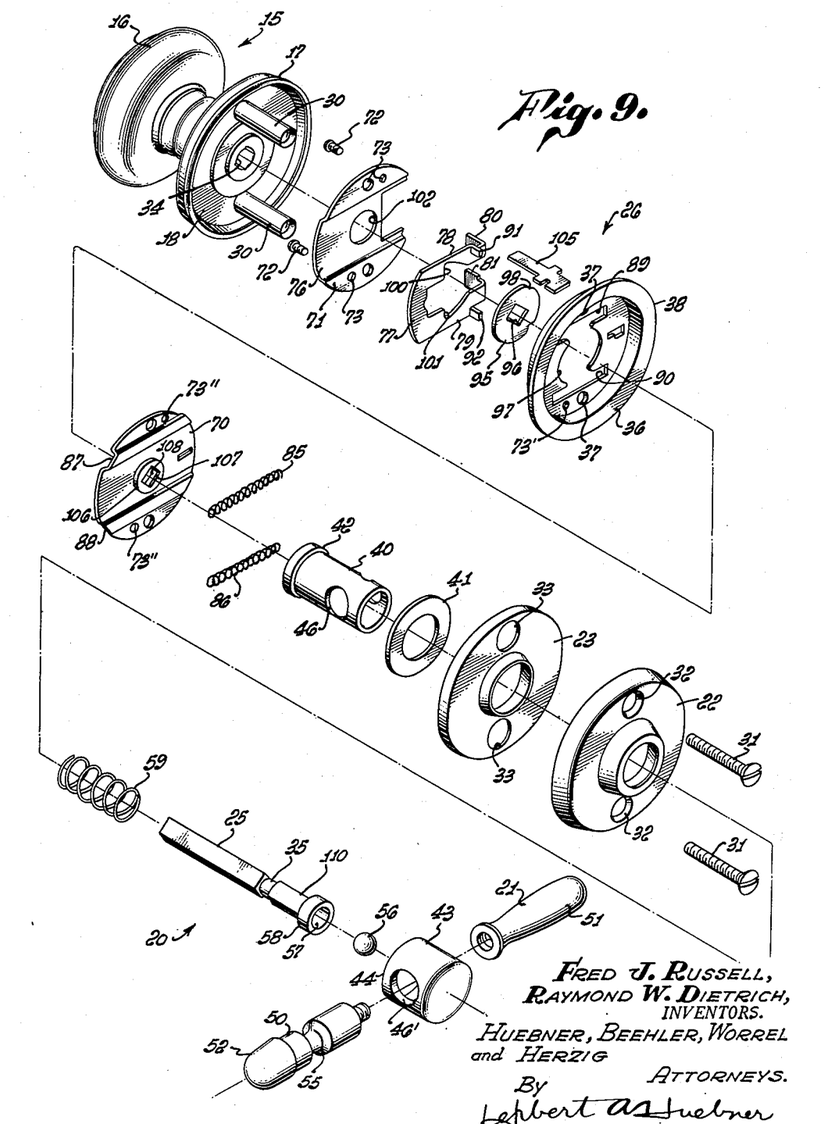
Figure 9 is an exploded view illustrating all of the parts of the lock except the latch bolt assembly.
Figure 10:
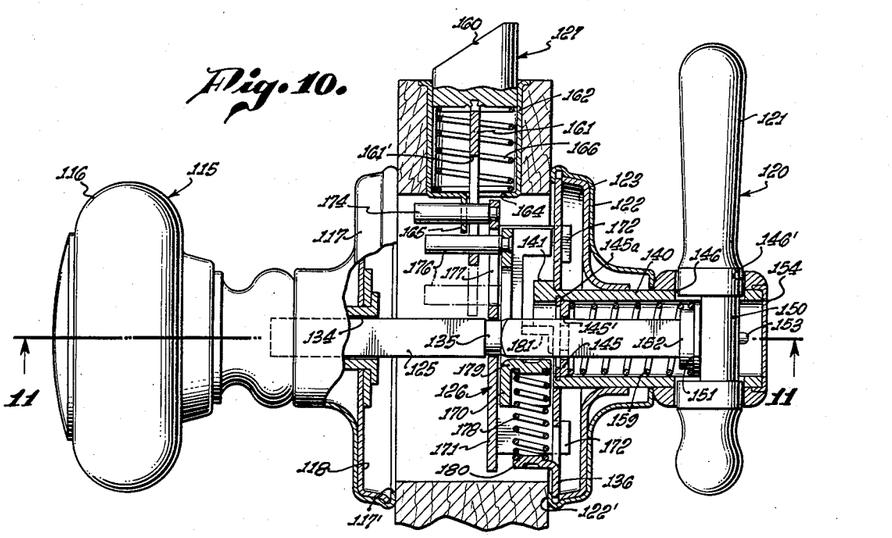
Figure 10 is a horizontal sectional view of an alternative form of lock installed in a screen door.
Figure 11:
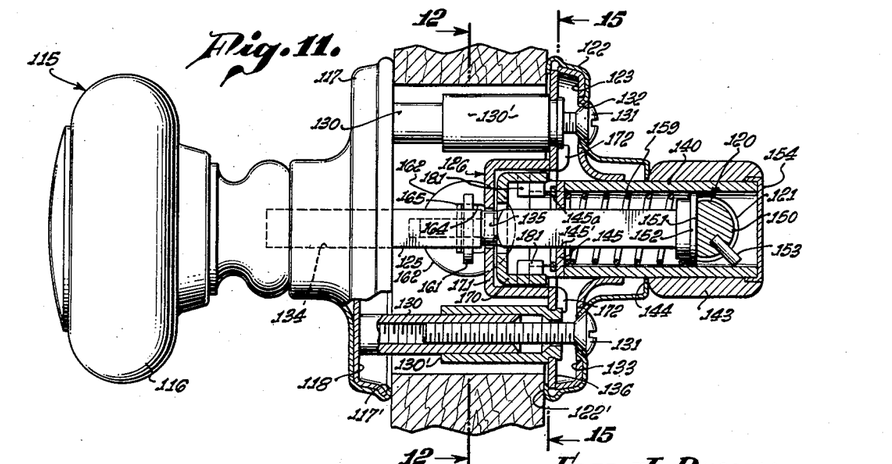
Figure 11 is a sectional view taken on the line 11—11 of Figure 10.
Figure 12:
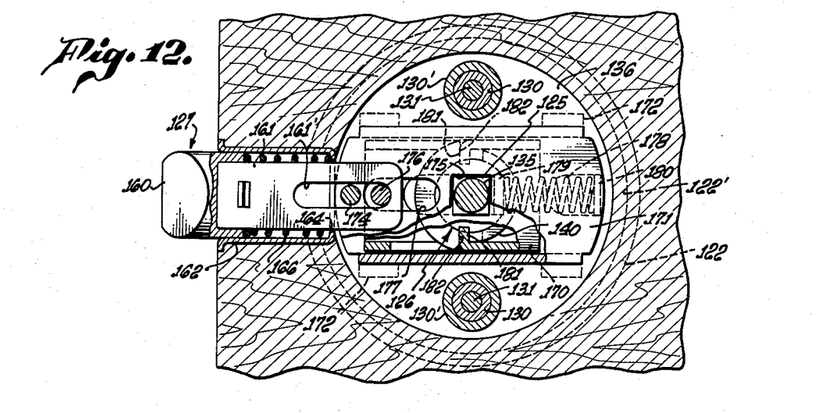
Figure 12 is a vertical sectional view taken on the line 12—12 of Figure 11.
Figure 13:
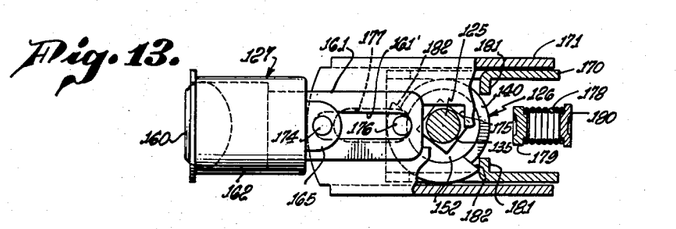
Figure 13 is a fragmentary vertical sectional view taken on the same line as Figure 12 showing certain of the parts in a different operative position.

To shift the spindle outwardly into locked position, the handle 21 may be moved axially into the position illustrated in Figure 6. As the groove 55 of the handle moves away from the ball 56, the surface of the handle functions like a cam to force the ball 56 away from the handle and imparting longitudinal movement to the spindle 25 against resistance of the spring 59. It is obvious that the longitudinal shifting of the spindle could be accomplished through mechanical means other than the specific form illustrated, as for example the handle 21 might be provided with a type of cam which would function upon an axial rotation rather than axial shifting of the handle.

The latch bolt assembly 27 is more or less conventional and will be briefly described so that the function of the locking mechanism 26 is more readily understood. This latch bolt assembly comprises a bolt 60 extending from which is a slotted T element 61. The bolt is slidable within the tubular housing 62, and when the parts are assembled the head 63 of the T is outside of the housing 62, being slidable through a slot 64 in the end of the housing. A guide member 65 is disposed in the housing, and the slotted extension of this guide member also extends through the slot 64 in the housing. Slots 61' and 65' in the T element 61 and the guide member 65 are provided to receive an actuating element of the lock mechanism, as later described. A compression spring 66 is seated in the housing 62 to normally urge the bolt 60 outwardly. Retraction of the bolt is accomplished by pulling inwardly on the T member 61.

Having in mind that one purpose of the locking mechanism 26 is to translate rotation of the spindle when in unlocked condition into a mechanical action which will retract the latch bolt 60, and another purpose is to establish a locked condition so that the spindle cannot be rotated and the latch bolt consequently cannot be retracted, the lock mechanism will next be described.

A relatively thin and approximately flat annular housing is formed by cooperation of the locking plate 36, a disc 70 to fit on the inside, which is preferably recessed as shown, and a cover 71 to fit against the outside. The disc 70 and the cover 71 are retained in fixed relation to the plate 36 by machine screws 72 threaded through holes 73, 73' and 73". Moreover, the disc 70 and cover 71 are provided with holes, not numbered, which obviously register with the holes 37 in the plate 36 and through which the mounting machine screws 31 extend. The housing is consequently non-rotatably held between the outer and inner mounting plates within the roses.

Figure 3:
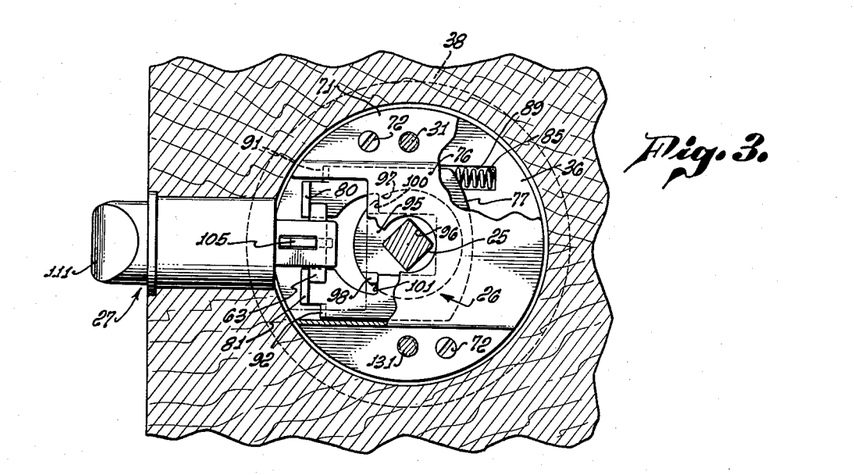
Figure 3 is a vertical sectional view taken on the line 3—3 of Figure 2.
Figure 4:
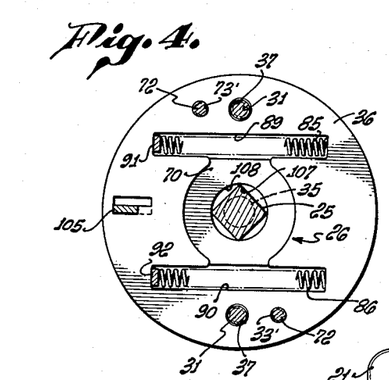
Figure 4 is a vertical sectional view taken on the line 4—4 of Figure 2.
Figure 5:
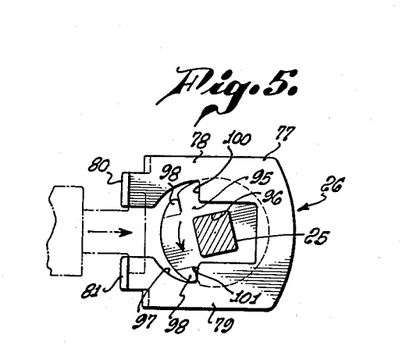
Figure 5 is a fragmentary vertical view partly in section as taken on the line 5—5 of Figure 2.

The cover 71 is formed with a plane surface recess 76 in which is slidably positioned a bifurcated slide member 77. This bifurcated member has arms 78 and 79 extending laterally from which are ears 80 and 81. The latter are adapted to engage with the head 63 of the latch assembly T 61, so that when the slide member is shifted laterally in the recess 76 in the righthand direction as viewed in Figure 3, it will retract the latch bolt 60 against the resistance of the spring 66.

The slide member 77 is normally urged outwardly (laterally in the left-hand direction as viewed in Figure 3) by springs 85 and 86. These springs are nested partly in grooves 87 and 88 formed in the disc 70 and partly in slots 89 and 90 cut in the plate 36. One end of the springs 85 and 86 seats against the corresponding ends of the slots 89 and 90, and the opposite end of the springs bears against small tabs 91 and 92 formed on the slide member 77. These tabs 91 and 92 ride in the slots 89 and 90.

Linear sliding movement of the slide member 77 may be manually imparted by a generally circular cam 95 having a square center hole 96 which registers with the spindle and which is rotatably confined in a circular cut-out 97 provided in the plate 36. This cam 95 is formed with lugs 98 extending axially of the cam and which are adapted selectively to engage, when the cam is rotated, either one of shoulders 100 or 101 formed in the slide member 77. Thus if the spindle is free to rotate, turning the same either by rotating the knob 16 or the handle 21 will rotate the cam 95, one of the lugs 98 of which (depending upon the direction of rotation) will engage either the shoulder 100 or 101 of the slide member 77, shifting the same in a linear direction against the compression of springs 85 and 86 and causing the ears 80 and 81 to engage the head 63 of the latch T 61, thereby retracting the bolt. The neutral positioning of the cam 95 will act as the stop for outward movement of the slide member 77. It may be pointed out that the cover 71 is provided with a central hole 102 of diameter large enough for the spindle to be freely rotatable therein.

A locating member 105 is secured in the locking subassembly, and when the entire device is assembled it is passed through the slot 65' of the guide member 65 to relatively position the locking sub-assembly and the latch assembly, and incidentally the member 105 also extends through the slot 61' of the T 61.

To permit the spindle to rotate freely in the unlocking position or to restrain it against rotation in the locking position, a boss 106 is provided on the disc 70 which has a square hole 107 therein matching with the square cross section of the spindle. Adjacent the boss an enlargement 108 of the hole 107 has a diameter sufficient to permit free rotation of the square cross section of the spindle therein. Formation of the boss is merely a matter of design choice and may be omitted. The important thing is the provision of the hole 107 with its adjacent enlargement 108.

Figure 1:
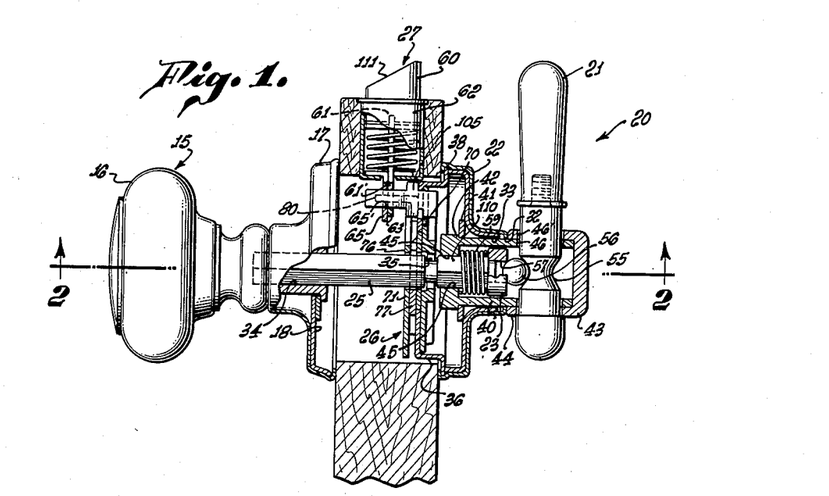
Figure 1 is a horizontal sectional view of the lock installed in a screen door.
Figures 2, 8:
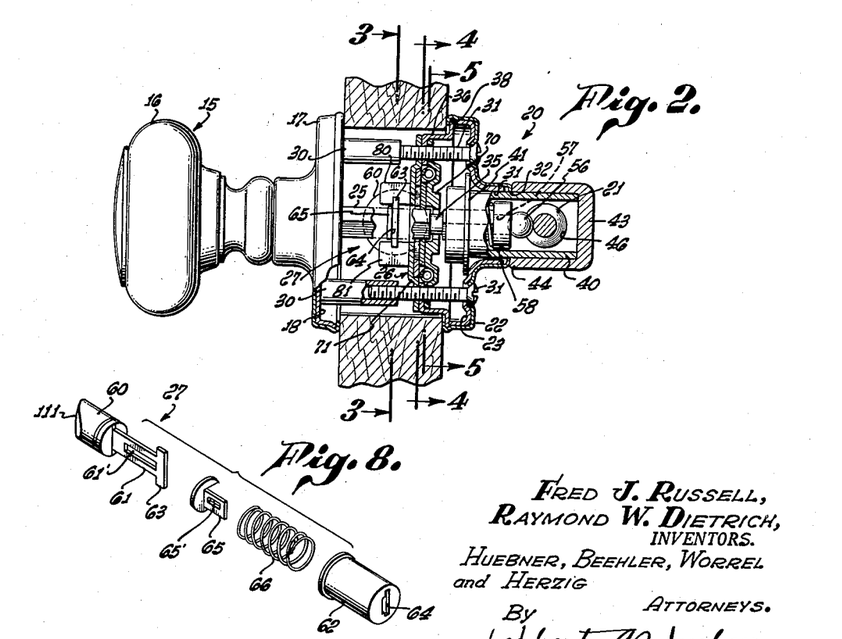
Figure 2 is a sectional view taken on the line 2—2 of Figure 1.
Figure 8 is an exploded perspective view of the latch bolt assembly employed in the lock.

By reference particularly to Figures 1 and 6 the action will be observed. In Figure 1 the spindle is positioned at its right extremity, which is the unlocked condition, in which the groove 35 in the spindle is aligned with the square hole 107 and, being unrestricted by the hole enlargement 108, the spindle is free to rotate.

In Figure 6 the spindle is shifted to its left extremity of position, which is the locking condition, and the squared end 110 of the spindle has entered the square hole 107. The disc 70 being fixed against rotation, in turn restricts the spindle against rotation, so that neither the knob nor the handle can be turned, no retracting action can be imparted internally to the latch bolt, and this locked condition remains until the handle 21 has been shifted back to the position of Figure 1 so that the spindle may move axially into the unlocked condition.

Whether the lock is in locked or unlocked condition, the latch bolt is free to move inwardly when pressure is applied externally as by the tapered face 111 thereof engaging a strike plate or equivalent during the closing of the screen door.

In Figures 10 to 16 is illustrated an alternative form of screen door lock differing in detail from but embodying the same principles as are employed in the form of lock first described. Certain of the parts in the two forms are identical and the primary functional objective is the same, namely to employ an axially shiftable square spindle which is actuated by movement of handle and of spring and which is provided with a rounded or reduced section, the spindle in one position having its square portion nonrotatably engaging with a complementary square hole in a plate and the spindle in its unlocked position having its reduced or rounded section aligning with the hole in the plate in non-engaging position whereby the spindle is free to rotate.

There is employed an outer operating assembly 115 including a knob 116, a rose 117 and a mounting plate 118. It comprises further an inner handle assembly 120 embodying a handle 121, an inner rose 122 and a mounting plate 123.

Extending between the outer operating assembly and the inner handle assembly is a spindle 125 which is operatively associated with a locking mechanism generally designated 126, the latter in turn being operatively connected with a latch bolt assembly 127.

Mounting posts 130 are fixed to the mounting plate 118 and are internally threaded to receive machine screws 131 which extend through holes 132 and 133 in the rose 122 and mounting plate 123. Mounting plate 118 is retained within rose 117 by crimping of edge 117' over edge of mounting plate 118. Sleeves 130' are adapted to telescope with the mounting posts 130. These sleeves 130' are rigidly fixed to a plate 136. Mounting plate 123 and plate 136 are confined within rose 122 by crimping of edge 122' over edges of mounting plate 123 and plate 136. This arrangement as in the other case enables the lock to be installed in doors of various thicknesses without adjustment. The spindle 125 extends into a socket 134 in the outer operating assembly in a manner to permit considerable latitude of relative positioning along the common axis.

The spindle 125 is non-circular, being preferably square, and the socket 134 is complementary to the spindle. As in the other form of the invention rotation of the outer operating assembly will rotate the spindle if the spindle is free to rotate; and if it is held against rotation, the knob 116 cannot be turned.

The spindle is formed with a circumferential groove 135 which has a relationship to the locking mechanism 126 to be later described in detail.

Figures 14, 15:
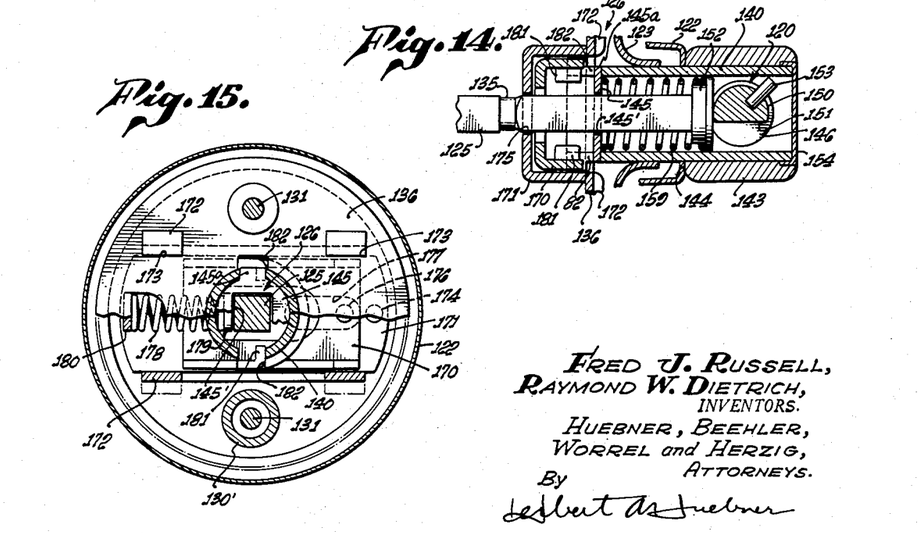
Figure 14 is a fragmentary sectional view taken on the same line as Figure 11 showing some of the parts in a different operative position.
Figure 15 is a vertical sectional view taken on the line 15—15 of Figure 11.
Figure 16:
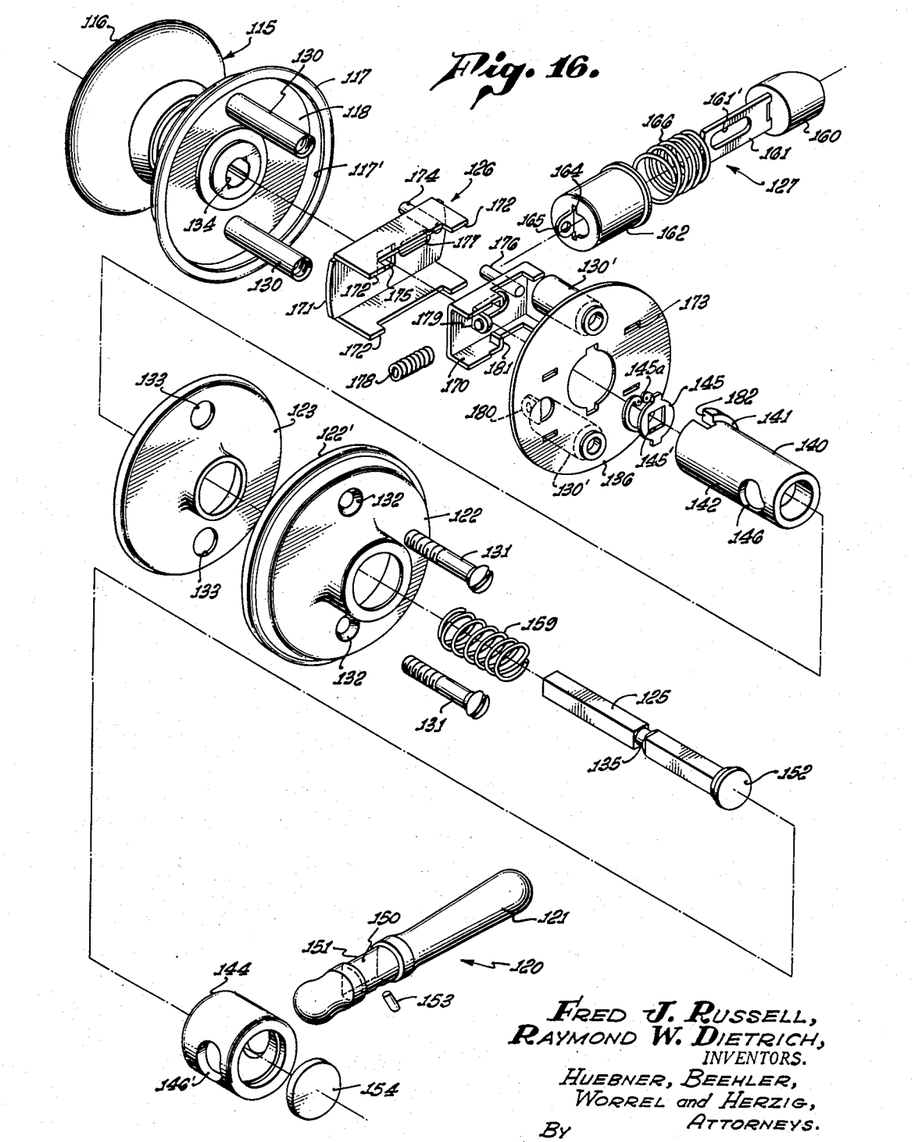
Figure 16 is an exploded perspective view illustrating all of the parts of the alternative form of lock.

As in the other form when the spindle 125, which is axially slidable, is in one position the spindle groove 135 is located so that the locking mechanism 126 permits the spindle to rotate (see Figure 11); but when the spindle is axially shifted so that the groove 135 is in another position, the square portion of the spindle comes into locking engagement with the locking mechanism, and the spindle is thereby held against rotation (see Figure 14).

The inner handle assembly is utilized as the normal means for axially shifting the spindle to a locking position and releasing it for spring return to unlocked position. This assembly comprises a sleeve 140 which engages against the inside surface of the plate 136, and a hollow cap 143 at the outer end of the sleeve having a shoulder 144 engageable with the outer end of the rose 122. Sufficient longitudinal play is provided for the sleeve to have free rotation within the mounting plate. A washer 145 which is fixed in the sleeve 140 by means of a lock ring 145a as shown is provided with a square bore 145′ complementary to the square portion of the spindle whereby rotation of the sleeve will impart rotation to the spindle. This rotation can be effected by turning the handle 121 which extends diametrically through the sleeve 140, being accommodated in holes 146 and 146′ in the sleeve and cap.

A one-piece handle is employed which is formed with a reduced neck 150 flattened on one side at 151. The spindle is provided at its end adjacent the handle with a combined spring retainer and head 152 which bears against the reduced portion of the handle thereby preventing the handle from being pulled out of the sleeve and cap assembly. In addition there is a stop pin 153, the primary purpose of which is to limit the rotation of the handle, but this pin also serves the secondary function of preventing retraction of the handle from the sleeve and cap. In order to insert the stop pin 153 when assembling the lock the end of the cap 143 is left open and is subsequently closed by an end cap 154 which is pressed into place as shown.

A compression spring 159 is mounted in the sleeve 140 bearing at one end against the spindle seat 152 and at the other end against the washer 145, the spring normally holding the spindle against the handle 120. When the handle is turned so that the flat face 151 meets the spindle head 152, which may be considered to be an inner position of the spindle, the spindle is in unlocked position.

To shift the spindle outwardly into locked position the handle 121 may be rotated on its own axis which effects a cam action by bringing the rounded portion of the neck 150 into engagement with the spindle head 152 thereby shifting the spindle 125 away from the handle and thus imparting longitudinal movement to the spindle 125 against resistance of the spring 159.

The latch bolt assembly 127 is more or less conventional and will be briefly described so that the function of the lock mechanism 126 is more readily understood. This latch bolt assembly comprises a bolt 160. Extending from it is a slotted element 161. The bolt is slidable within the tubular housing 162 and when the parts are assembled the slotted element is outside of the housing 162 being slidable through a slot 164 in the end of the housing. A tab 165 is formed from the end wall of the housing 162. A slot 161′ in the element 161 is provided to receive an actuating element of the lock mechanism, as later described. A compression spring 166 is seated in the housing 162 to normally urge the bolt 160 outwardly. Retraction of the bolt is accomplished by pulling inwardly the slotted member 161.

The lock mechanism 126 consists of a channel shaped slide 170 mounted within an outer channel housing 171, which in turn is mounted on the plate 136. The housing 171 has tabs 172 which extend through slots 173 of the plate 136 and are bent over. The housing 171 has a pin 174 which engages the tab 165 of the latch housing 162.

Centrally located is a non-circular hole 175 which is complementary in shape to the spindle 125. Slide 170 has a pin 176 which extends through a slot 177 of the housing 171 and engages the slot 161′ of the latch bolt assembly. The slide 170 is urged outwardly by a spring 178 which is held between a lug 179 extending from the slide 170 and tab 180 of the plate 136. The spring urges inwardly extending tabs 181 of the slide 170 against the faces 182 of the flange 141 of the sleeve 142. Upon the rotation of the sleeve 141, the faces 182 bear against one or the other of the tabs 181, thus sliding the member 170 inwardly. The pin 176 attached to this member will pull the latch 160 inwardly with it. The slot 161′ is elongated so that upon normal closure of a door the latch 160 may slide inwardly without movement of pin 176 and its related parts.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention, what we claim as new and desire to secure by Letters Patent is:

1. In a device adapted to operate a latch bolt mechanism, an operating assembly, a spindle non-rotatably keyed to said operating assembly, said spindle being axially movable with respect to said operating assembly between locked and unlocked positions, a latch bolt actuating hand hold on said operating assembly movable relative to the axis of the spindle respectively to locked and unlocked positions of adjustment, said hand hold having a portion thereof movable from a first position out of axially shifting engagement with the spindle to a position in axially shifting engagement with the spindle whereby to slide said spindle into one of said spindle positions, and means adapted to return said spindle to the other position upon return of said hand hold to said first position.

2. In a device adapted to operate a latch bolt mechanism, an operating assembly, a spindle non-rotatably keyed to said assembly and axially slidable relative thereto into a locking position and an unlocking position, a member having a non-rotatably fixed position in the device, said spindle being adapted to engage said member in locked position and being thereby restrained from rotating and being disengaged from said member in unlocked position and thereby free to rotate, a hand hold on said operating assembly transversely slidable relative to the axis of the spindle respectively to locked and unlocked positions of adjustment, said hand hold having a portion thereof movable endwise from one position to another position against the spindle in one of said positions of adjustment whereby to slide said spindle into one of said spindle positions, and return means operable between a stationary portion of the device and the spindle adapted to return said spindle to the other position upon return of said hand hold to said one position.

3. In a device adapted to operate a latch bolt mechanism, an operating assembly, a spindle non-rotatably keyed to said operating assembly and axially slidable relative thereto into a locking position and an unlocking position, a member having a non-rotatably fixed position in the device, said spindle being adapted to engage said member in locked position and being thereby restrained from rotating and being disengaged from said member in unlocked position and thereby free to rotate, a hand hold on said operating assembly transversely slidable in the assembly respectively to locked and unlocked positions of adjustment, said hand hold having a cam way facing in both transverse directions and a cam on said spindle adapted to engage said cam way, said cam way being movable endwise to a position against the cam in one of said positions of adjustment whereby to slide the spindle into one of said spindle positions, and return means acting against the spindle adapted to return said spindle to the other position upon return of said hand hold to the other of said positions of adjustment.

4. In a device adapted to operate a latch bolt mechanism, an operating assembly, a spindle non-rotatably keyed to said assembly and axially slidable relative thereto into a locking position and an unlocking position, a member having a non-rotatably fixed position in the device, said spindle being adapted to engage said member in locked position and being thereby restrained from rotating and being disengaged from said member in unlocked position and thereby free to rotate, a hand hold on said operating assembly rotatable relative to the axis of the spindle respectively to locked and unlocked positions of adjustment, said hand hold having a circumferentially eccentric cam way, and a cam on the spindle adapted to engage said cam way, said hand hold being rotatable from one position out of engagement against the spindle to another position against the spindle in one of said positions of adjustment whereby to slide the spindle into one of said spindle positions, and return means acting against the spindle adapted to return said spindle to the other position upon return of said hand hold to said one position.

5. In a device adapted to operate a latch bolt mechanism, an operating assembly, a spindle non-rotatably keyed to said operating assembly, said spindle being axially slidable relative to said assembly into a locking position and an unlocking position, a non-rotating member, said spindle when in locking position engaging said member and being thereby prevented from rotating and when in unlocking position being free from restraint by said member and consequently rotatable, manually operable means adapted to slide said spindle comprising a handle on the operating assembly mounted transversely of the axis of the spindle, and a cam surface on the handle adapted to be moved by the handle into endwise engagement with the spindle thereby to slide the spindle to one of said positions, and means operable against the spindle adapted to return the spindle to the other position upon movement of said cam surface out of engagement with the spindle.

References Cited in the file of this patent

UNITED STATES PATENTS

| Number | Name | Date |
|---|---|---|
| 2,497,750 | Wardwell | Feb. 14, 1950 |

FOREIGN PATENTS

| Number | Country | Date |
|---|---|---|
| 7,045 | Great Britain | Apr. 5, 1893 |